G. E. W. SPARRENDAHL 3,112,369

TELECOMMUNICATION SYSTEM

Filed April 14, 1960

INVENTOR.
GUNNAR ERIK WILLIAM SPARRENDAHL
BY *Hause and Nydick*

ATTORNEYS

3,112,369
TELECOMMUNICATION SYSTEM
Gunnar Erik William Sparrendahl, Johanneshov, Sweden, assignor to Telefonaktiebolaget L M Ericsson, Stockholm, Sweden, a corporation of Sweden
Filed Apr. 14, 1960, Ser. No. 22,153
Claims priority, application Sweden Apr. 30, 1959
6 Claims. (Cl. 179—15)

The present systems for wholly electronic, automatic telephone exchanges are based on transmission of an analog signal through the telephone exchange. This is valid both for the electronic telephone exchanges according to the principle of space division and for those according to the principle of time division (TDM-system). Transmission of analog signals without distortion is often involved with certain difficulties, since analog signals are sensitive to disturbances in the form of cross-talk and noise. Further, the transmission systems have limited possibilities of transmitting signals with great amplitude variations.

Within the transmission technics there has been a change to a certain extent to quantisize the signal to certain amplitude values before the transmission and to transmit these amplitude values in digital form. At PCM-systems 128 amplitude values (i.e. 7 binary digits) are the most commonly used, at which testing of the analog signal occurs just as often as at TDM-systems, i.e. about 10,000 times per second. At delta modulation (see for example Communication News, June 1952, page 115 and following, especially page 118 and following published in Holland) the analog signal is tested about 10 times as often as at common TDM-systems, but at each testing according to this system it is only determined if the analog signal differs from the signal transmitted at the preceding test more than a certain value equal to the quantisizing step.

The information, which is transmitted during a time that one of the transmission possibilities of the exchange equipment is allotted a certain communication, hereinafter will be called information block. For each information block a connection path through the telephone exchange is chosen by the data processing equipment. It can also be said that establishing and releasing through the telephone exchange occurs each time one of the communicating persons starts or stops talking respectively.

The present system for automatic long distance traffic consists partly in main exchanges, partly in line concentrators depending on said main exchanges, at which first the main exchanges are provided with central equipment for data processing of establishing information.

According to the present new system for automatic long distance traffic the speech information at telephone calls is transmitted from a telephone exchange to a telephone instrument in the form of a delta modulated signal, which is demodulated in the telephone instrument. Transmission of speech information from the subscriber instrument to the nearest telephone exchange occurs in analog form. Modulation of the analog signal can be done in different ways depending on the art of the telephone exchange that the subscriber line is connected to and the extent of its memory equipment. If the subscriber line is directly connected to a large telephone exchange, which hereinafter will be called the main exchange (HC), direct transformation of the analog signal to a delta modulated signal occurs at local traffic. At tandem exchange traffic it is more suitable to transform the analog signal to a PCM-signal. Sampling of the subscriber lines, which at the moment gives off information, occurs with the frequency of about 10,000 p./s., which is common at TDM-systems.

In order to be able to transform an analog signal into a delta modulated signal in an equipment common for several subscriber lines, the amplitude value sent to the addressee during the previous test must be registered in a memory.

If the exchange is provided with memories for the amplitudes of the quantisized signals at a sampling frequency of 10 kc. and a pulse frequency of 100 kc. on the delta modulated signal at each sampling a comparison occurs between the sampled amplitude value in question and amplitude values in binary form, which were registered in the exchange memory and one of which is the amplitude value reached by the address instrument owing to the signal sent previously. The difference between the sampled amplitude values and the amplitude values registered in the memory is coded in delta modulated form (delta code) in 10 digits and is sent to the address instrument at the same time as the new amplitude value that the address instrument will reach is registered in binary form (PCM-form) in a memory. At high speech levels and at the same time high frequencies it is not possible to reproduce the signal by a delta code. The exchange tries in this case to reproduce the signal as far as possible, whereby the amplitude values of the signal sent to the address instrument is registered in the exchange memory.

If the subscriber line is connected to a line concentrator (LK), which is not provided with a memory for storing of the amplitude values of the quantisized signals, delta modulation of the analog signal can not be done in an equipment common for the exchange. In such an exchange the sampled analog signal is coded in PCM-code in a PCM-coder common for the exchange. The information block is then transmitted in PCM-code to the main exchange.

In the main exchange transformation of the PCM-code to delta-code occurs at local traffic by aid of amplitude values registered in a memory in principally the same way as above described for the directly connected lines. It ought to be mentioned that at coding of the analog signal into PCM-code and at recoding of the PCM-code into delta code compression respectively expansion of the signal can occur. As the principles and methods for this are known this problem will not be further discussed here.

The memory equipment for the individual communication channels need not necessarily be a word in a ferrite memory. Each communication channel shall be provided with a shifting register with series input and parallel output for the incoming lines and parallel input and series output for the outgoing lines. This logical problem can be solved with other components than words in ferrite memories, for example with shifting registers consisting of twistor elements. Of course, the shifting register function can also be obtained in the usual way within the electronic computer technics.

Hereinafter speech information will foremost be dealt with, but it can easily be seen that the described exchange equipment to a great part can be used for the intermediation of a mixture of data and speech information.

The new system for quantisized telephony will here be described in connection with drawings, which show an applicable example of the system at a small telephone exchange with its new equipment according to the invention. In the figures:

FIG. 2–FIG. 6 show certain diagrams over a small telephone exchange, which can act as a line concentrator or terminal station in a telephone network for quantisized telephony, at which FIGS. 7–9 show the essential parts of a main excahnge according to the invention, at which

The new system for quantisized telephony requires also a new telephone instrument.

Figure 1:
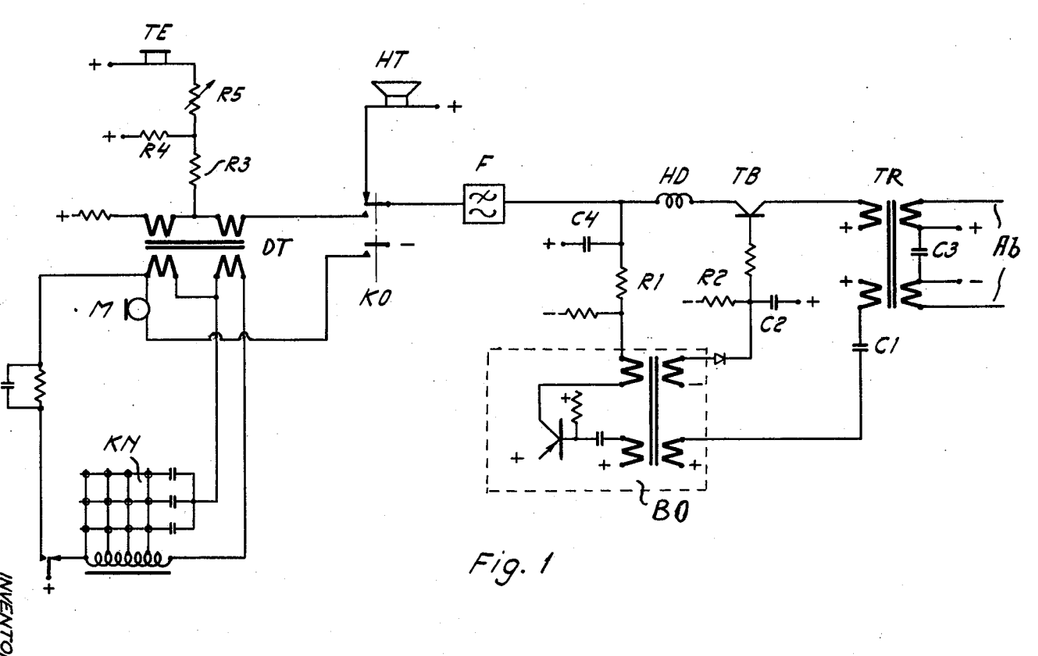
FIG. 1 shows a diagram over a new telephone instrument in a new system for quantisized telephony, provided with a delta demodulator.

The diagram of an example of such a telephone instrument appears in FIG. 1. The instrument is constructed to receive delta modulated speech information from a subscriber line $Ab$ and to send speech information in the form of a common voice frequency signal to the subscriber line. Establishing information is foremost sent by aid of a key set KN, for example of the type described in Bell System Technical Journal, March 1958, page 339 and following, especially FIG. 7 (page 351) published in the United States.

The current feeding is done over the subscriber line. A condenser $C3$ over-bridges the peaks in the current consumption, which appears at the reception of a signal, which is modulated with a great amplitude.

The pulse frequency of the delta modulated signal from the subscriber line is 100 kc. Through the transformer TR and the small condenser $C1$ the blocking oscillator BO is triggered by the pulses received from the subscriber line. The condenser $C1$ is small in order to prevent the blocking oscillator BO from being disturbed by the tone frequency signal. The high frequency coil HD prevents the first pulse in each information block from the subscriber line from being short-circuited by $C4$. The delta modulated signal is demodulated after amplification through BO by an integration circuit $R1$—$C4$, which is the delta modulator, and the low pass filter F. The first pulse in each information block renders the normally conducting transistor TB non-conducting. The integration circuit $R2$—$C2$, which has a time constant of the size 1 ms, renders the transistor TB non-conducting during the whole information block.

If the handset is replaced the hook contacts KO is in the position shown in FIG. 1. The demodulated signal from the subscriber line passes then directly to the loud speaker HT for signalling. The signal is of such a level that it is sufficient for signalling, which is possible to obtain with delta modulation at the low frequency of about 400 p./s., which is used for signalling. The power is, of course, supplied by the direct current feeding over the subscriber line.

When the handset is off hook the demodulated signal passes over the hook contacts KO and the differential transformer DT and the attenuator $R3$, $R4$, $R5$ to the receiver TE. The attenuator lowers the level of the signal to a position usual for the receiver. The microphone M obtains current feeding over contact on KO. When no signal is obtained from the subscriber line speech currents pass from M over DT and the low pass filter F, the transistor TB and the transformer TR out on the line. The condenser $C4$ and the coil HD can be considered component parts of the filter F and they do not cause attenuation of the low frequency signal from the microphone M.

The simple embodiment of the delta modulator shown in FIG. 1, which consists of said integration circuit $R1$—$C4$, makes it necessary for the data equipment of the main control board to start each information block with a pulse series, which sets the right zero potential over the condenser $C4$.

LINE CONCENTRATOR (LK) FIGS. 2–6

The shown example of embodiment refers to a line concentrator for maximally 100 subscriber lines and maximally 10 outgoing and 10 incoming junction lines with a main exchange.

Each junction line is provided with 10 memory cores and a pulse amplifier. The memory core matrix of 100 cores $im1$–$im100$ for incoming junction lines are indicated $Iim$ on FIG. 2, corresponding 100 cores $um1$–$um100$ for outgoing junction lines $Ium$ (FIG. 3), and correspond 1000 cores $bm1$–$bm1000$ for subscriber lines $Ab1$–$Ab100$ $Abm$.

Figure 2:
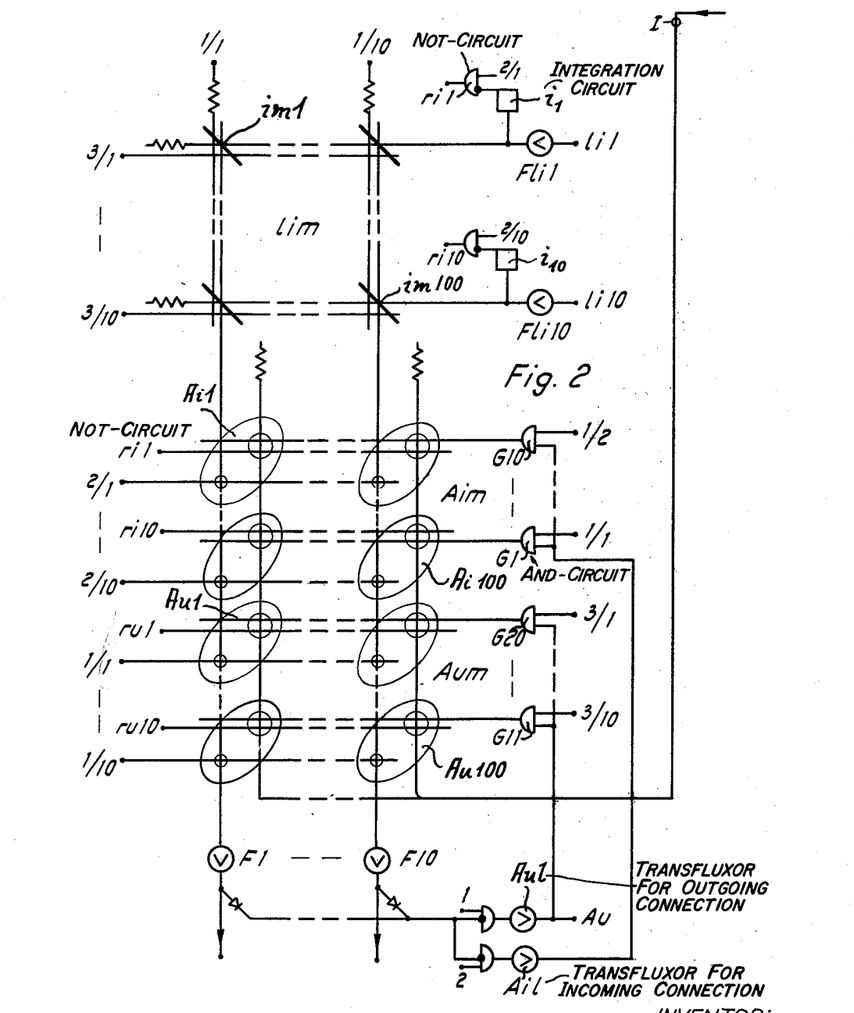
FIG. 2 shows the part of the diagram, which comprises arrangements for writing of information block in memory matrixes and address memories (transfluxor memories) for incoming respectively outgoing lines.

For registration of the number of the subscriber line, which the junction line is connected to at the moment, each junction line with a main exchange is assigned 10 transfluxors $Ai1$–$Ai100$. In them the subscriber line number is registered in 2 of the 5-code, consequently 10 cores $im1$–$im100$ are required for registration of units and tens digits of 100 subscriber lines. In FIG. 2 the transfluxor memory for incoming junction lines is indicated $Aim$ consisting of transfluxors $Ai1$–$Ai100$ and for outgoing junction lines $Aum$ consisting of transfluxors $Au1$–$Au100$.

The line concentrator comprises also a PCM-coder (indicated in FIG. 3) for transformation of the amplitude of the speech potential existing on the subscriber lines to binary digit form. The form of embodiment of the PCM-coder is not stated in the figures (only a reference in FIGS. 3 and 7), but is described in several forms in the literature, for example in Bell System Technical Journal, January 1948, page 31 published in the United States.

Figure 5:
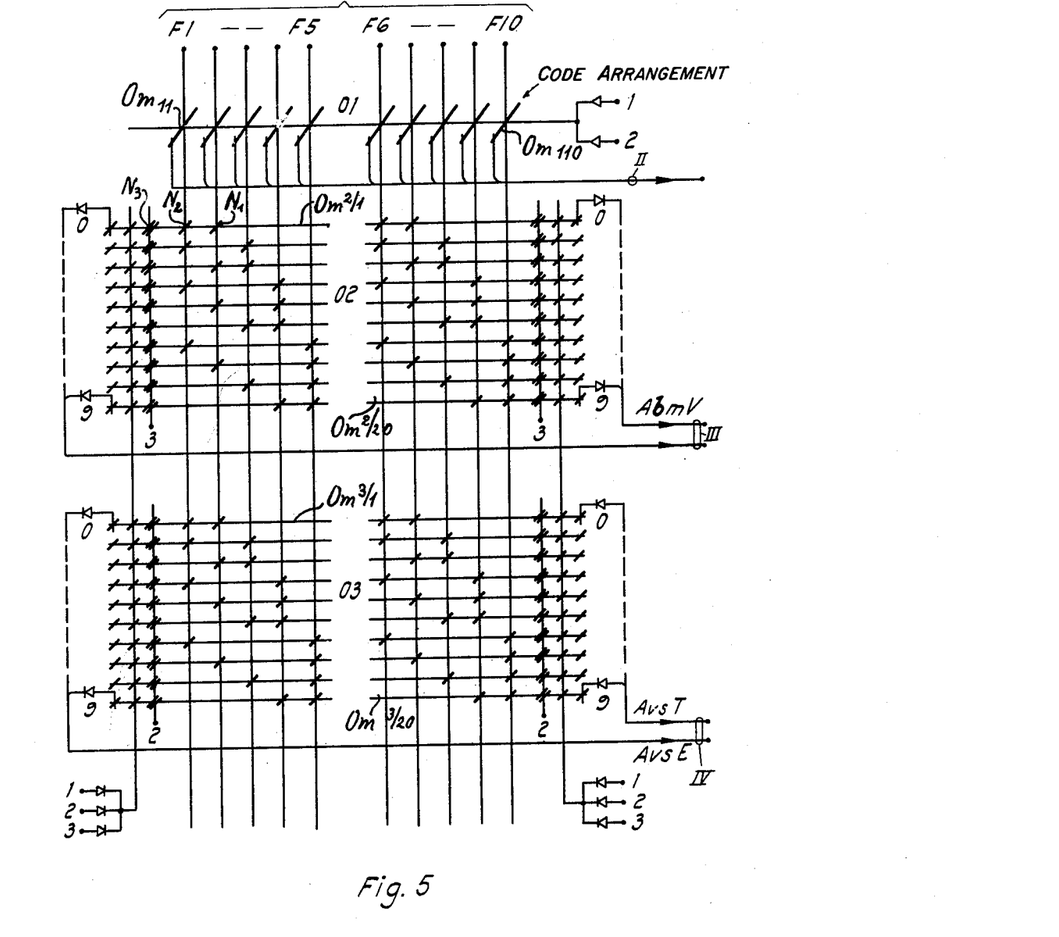
FIG. 5 shows recoding equipments in the form of core matrixes, which are component parts in a line concentrator according to the invention.
Figure 6:
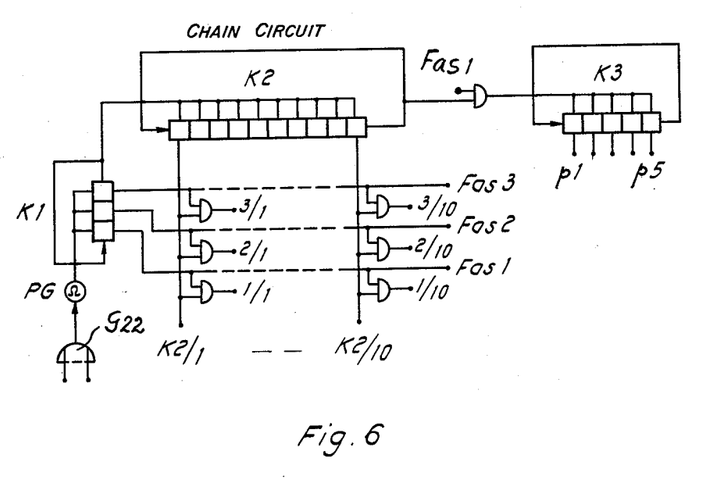
FIG. 6 shows according to the invention joint pulse generating and pulse distributing unit for a telephone exchange.

The line concentrator is controlled by a common pulse generating unit according to FIG. 6. This unit consists of a pulse generator PG, which generates pulses with a frequency of 300 kc. PG is synchronized by the pulses obtained on the incoming junction lines through the or-circuit G22 from a main exchange. PG operates a pulse counting chain K1, which consists of 3 stages for example consisting of ferrite cores or diodes. The chains K1–K3 are of the same construction. Accordingly K1 makes one cycle on 10µs. and gives off the pulses phase 1, phase 2, phase 3, which on FIGS. 2–5 are indicated 1, 2, 3. For each K1 cycle the chain K2 is moved one stage. K2 consists of 10 stages and makes consequently one cycle on 100 µs. During each cycle of the chain K2 the chain K3 makes one stage. K3 goes accordingly one stage on 500 µs. K2 gives off in combination with K1 the 30 phase shifted pulses 1/1, 2/1, 3/1, to 1/10, 2/10, 3/10. K3 gives off the pulses $p1$ to $p5$.

FIG. 5 shows three recoding arrangements O1, O2, O3, of which O1 consists of 10 ferrite cores $Om11$–$Om110$ and recording arrangement O2 of 20 ferrite cores $Om$ $2/1$–$Om2/20$. The windings of the ferrite cores in recoding arrangements O2 and O3 are indicated by diagonal lines, the number of strokes being proportional to the number of turns, for example the core $Om$ $2/1$ is switched by the windings N1 and N2 and restored by the winding N3, which has twice as many turns as the other windings. The recoding arrangement O3 is constructed identically with the arrangement O2.

Remaining parts of LK appear of the following decription of the course of events.

(A) *Treatment of the Information From Incoming Junction Lines (li), in the Example According to FIG. 2, li1–li10*

An information block from a main exchange is always introduced by a subscribed line number. A main exchange, which in the following will be indicated HC, sends said number in such a pulse phase position that the whole number is read all at once in *lim* (FIG. 2). As appears in FIG. 2 the writing in in *lim* is done through current coincidence between the pulses 1/1 to 1/10 and the pulses from the pulse amplifiers FL*i*1–FL*i*10. Reading is done through pulses 3/1 to 3/10. For example on the junction line *li1* the first pulse position at the reception of subscriber line numbers must accordingly be 1/2 to make the whole number readable all at once, because the reading is done through the pulse 3/1. Furthermore, in doing so, 2 of the 5-code must be phase shifted in such a way that at reading of *lim* the same code is obtained to the amplifier F1 to F10 independent of over which junction line the number is obtained. As appears of the following HC does not need to take any such regard to the construction of LK at the transmission of speech information.

DISPOSITION OF THE PULSES PHASE 1-PHASE 3 IN FIG. 6

| Phase | 1 | 2 | 3 |
|---|---|---|---|
| lu (lu1-lu10) | Aum | Coder | lum |
| li (li1-li10) | Abm | Aim | lim |
| testing | x | | x |
| lum (Fig. 3) | (x) | (x) | |
| lim (Fig. 2) | x | | |
| Abm (Fig. 2) | | x | |
| Aim (Fig. 2) | x | | |
| Aum (Fig. 2) | | | x |

(Under-line of short dashes=reading; underlined line= writing in.)

From the table for the phase disposition appears that during present sending of information block the subscribed line number is read from A*im* during the phase 2 while *lim* is read during phase 3. If there is no subscriber line number in A*im* the monostable unit A*il* is triggered which gives the one condition to the and-circuits G1 to G10. If a word is read from *lim* during the next following phase 3, it must be a subscriber line number. After amplification in the amplifiers F1 to F10 the number is registered in the 10 cores O1. The number is read from O1 during the next following phase 1, and is amplified in the amplifiers F11 to F20 in FIG. 3 and is written in the transfluxor memory for incoming junction lines A*im* through current coincidence with the pulse in question through the and-circuits G1 to G10. The subscriber line number is consequently registered in the place in A*im* corresponding to respective incoming junction line.

The information, which in the following is read from the *lim*-word of the junction line in queston, is transmitted to the word in A*bm* indicated by A*im*. The subscriber line number is read from A*im* during phase 2 and is registered on 2 of the 20 ferrite cores in the code translator O2 (FIG. 5). During phase 3 the subscriber line number is read from O2 and causes switching of one of the 100 ferrite cores in the subscriber memory selector A*bm*V through current coincidence between one of the 10 coordinate conductors for units and one of those for tens digits. It should be observed that the reading ampere turn number in the ferrite cores of the recoding arrangements O1, O2 and O3 is greater than the writing-in ampere turn number, so that reading can be done in spite of the ferrite cores at the same time obtaining writing-in currents from the amplifiers F1 to F10 (FIG. 2). During phase 3 *lim* for the corresponding junction line is also read. The word is registered in the recoding arrangement O1. During phase 1 O1 is read and the word is written in A*bm* (FIG. 3) through current coincidence between currents from the amplifiers F11 to F20 and current from the core in A*bm*V switched during phase 3, said core being reset during phase 1. The transfluxor memory A*im* (FIG. 2) is at this moment not actuated since the and-circuits G1–G10 are inhibited when the monostable amplifier A*il* is not triggered.

Transferring of 10 bits from *lim* to A*bm* occurs once every cycle of the chain K2 (FIG. 6) to each of the subscriber lines that have their numbers registered in A*im*. During each stage of the chain K2 corresponding cores in A*bm* for all the subscriber lines are read during phase 2. The pulses from A*bm* trig the monostable amplifiers AF and are thus repeated out on the subscriber lines.

Figure 3:
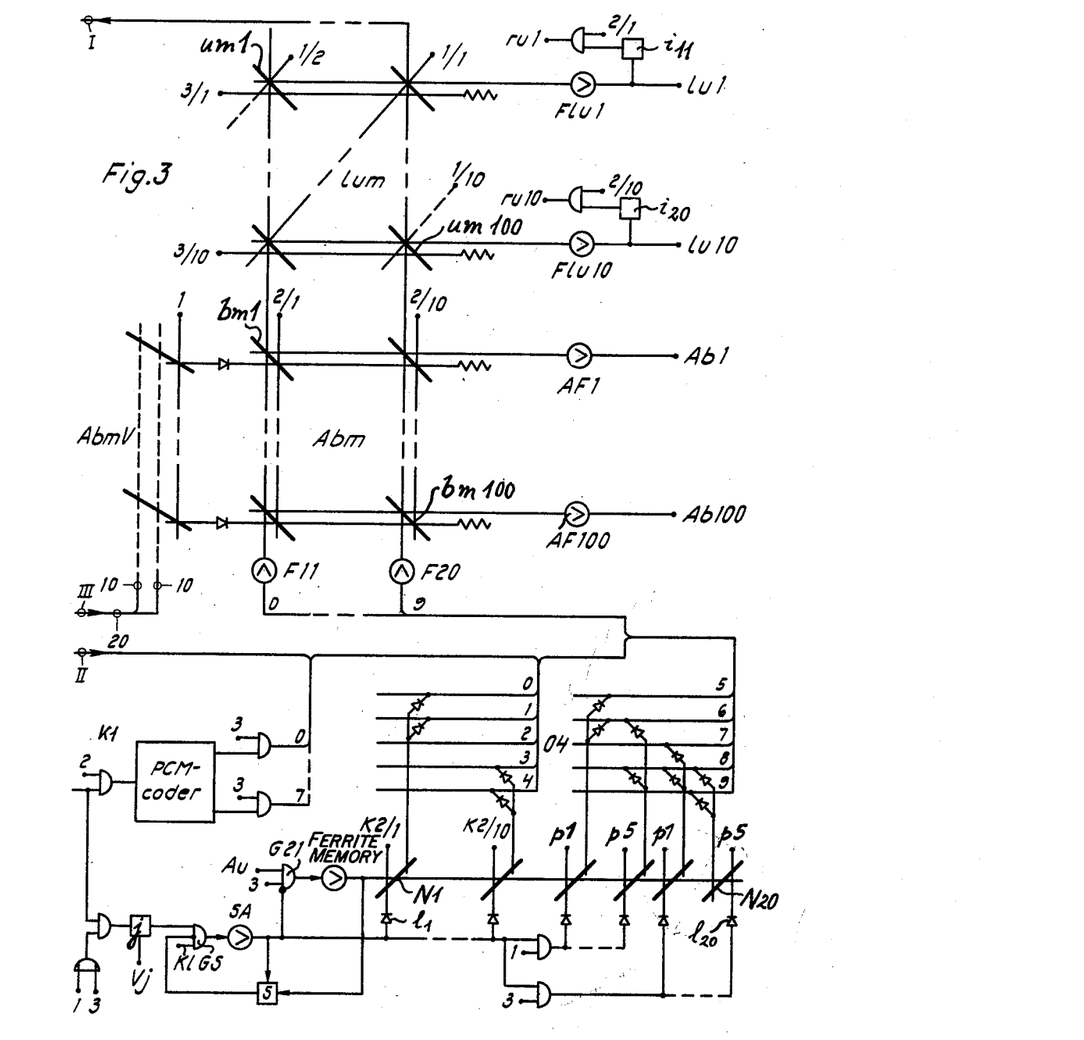
FIG. 3 shows memory core matrixes for outgoing junction lines and subscriber lines.

FIGS. 2 and 3 show that the pulses will be repeated from A*bm* in the same sequence as they have been received in *lim*. For example the first pulse in the *lim*-word read by the pulse 3/1 is registered by the pulse 1/2. This word is written in in A*bm* by the pulse 1/2. The first pulse is consequently read from A*bm* during 2/2 and is the same pulse as the first registered one in *lim*.

To each pulse amplifier for the incoming communication lines FL11–FL*i*10 an integration circuit *i*1–*i*10 belongs with a time constant of about 1 ms. If no pulse is obtained over respectively *li*1–*li*10 for 1 ms., the not-circuit *ri*1–*ri*10 is opened for respective junction line, and the subscriber line address in A*im* is erased in the word belonging to the junction line. If no pulse is obtained for 1 ms. the information block in question from HC is finished. The next word to be obtained over said junction line is a subscriber line number.

(B) *Sampling of the Subscriber Lines*

Figure 4:
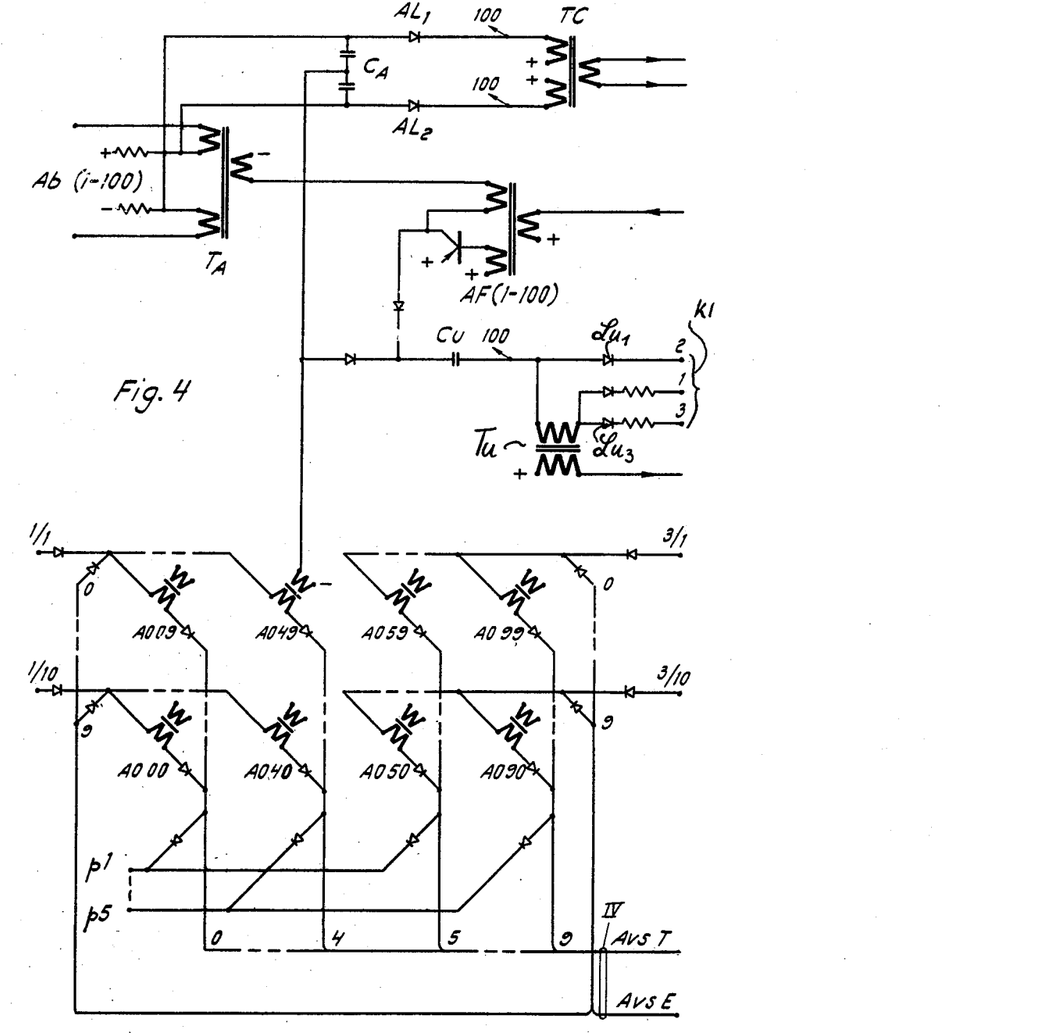
FIG. 4 shows the subscriber line equipment for a subscriber line as well as subscriber-and-circuits for sampling.

The subscriber line equipment for a subscriber line and the subscriber-and-circuits for sampling appear in FIG. 4. Said equipment consists of a line transformer TA and a gate circuit for the analog signal consisting of condensers CA and amplifiers AL1 and AL2 and a pulse transformer TC common for the exchange. Further, each subscriber has a monostable amplifier AF, a condenser C*u* for indication of busy condition connected to an and-circuit common for the exchange, consisting of a transformer TU and rectifiers L*u*1–L*u*3. Each subscriber has further a sampling-and-circuit AO, in which a pulse transformer and a rectifier are included, in the example eight sampling-and-circuits AO09 to AO99 are shown. For the sake of clarity only the connection of one sampling-and-circuit AO49 to the rest of the individual subscriber equipment is shown. As appears of the table testing of free subscriber lines occurs during phase 1 and phase 3, while sampling of the subscriber lines, the addresses of which are registered in A*um*, occurs in phase 2. The testing of the subscriber lines 00–49 in the exchange LK chosen as an example occurs during phase 1, while testing of the subscriber lines 50–99 occurs during phase 3. Consequently all the 100 subscriber lines are gone through on 500 μs. Sampling or testing of for example the circuit AO49 in FIG. 4 occurs when the pulses 1/1 and p5 turn up simultaneously. At this a pulse through the transformer in said and-circuit AO49 is obtained, said pulse passes through the condensers CA and the rectifiers AL and bifilarly through the primary winding of the transformer TC to plus. Consequently the pulse causes that the voltage being over the condensers CA is transmitted to the secondary side of the transformer TC. When the pulse is finished the rectifiers AL1 and AL2 are non-conducting again.

The transformer TA and the condensers CA are dimensioned as a low pass filter for the speech currents and attenuates thus the pulses of the frequency 100 kc. which through lack of balance in the subscriber cable, are received from other subscriber lines.

The purpose of the testing that occurs during phase 1 and phase 3 is to discover if there is a call or speech signal on a "free" subscriber line. This is done through comparison of the sampled voltage and the voltage $Vj$ in the comparison circuit $j$, FIG. 3. However, at this the subscriber lines, the addresses of which are in $Aim$ or $Aum$, must be marked busy. This busy marking consists in the condenser $Cu$ (FIG. 4) being charged on these subscriber lines. $Cu$ is charged during phase 2 if pulse at this is obtained from either the subscriber-and-circuit AO or the pulse amplifier AF for respective subscriber. $Cu$ is assumed to have a discharge time constant of about 1 ms. Only if $Cu$ is discharged a pulse on the conductor K1 is obtained during phase 1 and phase 3. If there is a signal on the subscriber line in question the monostable unit SA (FIG. 3) and the bistable unit S are triggered. S prevents that several calls are obtained before the call in question is settled through inhibiting the gate circuit GS. $Sa$ causes in combination with pulses from the chains K2 and K3 (FIG. 6) that the "calling" subscriber line number is registered on the 20 ferrite cores N1–N20. The number remains registered on these cores until a free place in $Aum$ is found and thus a free outgoing junction line to HC.

As appears in FIG. 2 the pulse $Au$ is obtained during phase 1 if there is no subscriber line number in corresponding word in $Aum$. The pulse is assumed existing during both phase 1 and phase 3. During phase 3 the gate circuit G21 in FIG. 3 is opened, at which the 20 ferrite cores N1–N20 are read. Simultaneously the bistable unit S is restored. If the "call" is obtained during phase 3, G21 is inhibited by the pulse from SA so that the number has time to be registered in the cores N before being read. Consequently the next $Au$-pulse is here waited for.

The number read from the 20 ferrite cores N1–N20 is recoded by aid of diodes 04 to 2 of the 5-code. Each conductor from the cores N is connected to 2 diodes, which transmit voltage to 2 conductors going to the amplifiers F11–F20. The number is written in by aid of the amplifiers F11–F20 in $lum$ and $Aum$ in the words corresponding to the position of the chain K2. Since the pulse $Au$ exists, one of the and-circuits G11 to G20 is open and causes writing-in current in $Aum$. Writing-in half-current in $lum$ is always existing during phase 3.

(C) *Transmission of Information to the Main Exchange HC*

Reading of $lum$ occurs during phase 1, at which, as appears in FIG. 3, the reading cabling in the core matrixes is so designed that the pulse written in through the amplifier F11 is always read first, independent of under which position of the chain K2 it is written in.

The subscriber line number is read from $Aum$ during phase 1 and is registered in the recoding equipment in two of 20 ferrite cores in the recoding arrangement O3 according to FIG. 5. During phase 2 the two switched ferrite cores in the recoding arrangement O3 is read, whereby a pulse is obtained on one of the 10 conductors $AvsT$ and one of the 10 conductors $AvsE$. Consequently a pulse is obtained through one of the 100 subscriber-sampling-and-circuits AO00–AO99, and therefore the amplitude of the tone frequency potential existing over CA is transmitted to the PCM-coder (FIG. 3). During phase 3 the amplitude value coded in binary form is transmitted from the PCM-coder through the amplifiers F11–F20 and is written in in the word of the junction line in question in $lum$ (FIG. 3). At this the whole $lum$-word need not necessarily be used. The PCM-coder is so designed that if there is no alternating voltage over CA the coder produces the binary number 0. When the speech voltage or another alternating current signal ceases over CA the pulse amplifier $Flu$ (FIG. 3) of the junction line in question obtains no pulses. After a certain time the potential from the integration circuit $i11$–$i20$ (FIG. 3) of the junction line to the gate circuit $ru1$–$ru10$ ceases. During phase 2 a pulse is consequently obtained through $ru$, which erases the word of the junction line in question in $Aum$. The junction line to HC is then free again.

(D) *Hook Signalling*

When the handset rests in the cradle a high sample amplitude determined by the battery potential is obtained at testing of the subscriber circuit. This amplitude does not cause any call in the comparison circuit, as it is in another magnitude range than normal speech voltages. With an on hook signal a transient is obtained, which turns into a potential determined by the battery potential. The line concentrator LK ends at this the information block with a one in the position 10, which normally is not used for amplitude values. At the same time LK erases the address in $Aum$ for the junction line in question. This is not shown in the FIGURES. In HC the code specific for the on hook signal causes that the on hook signal is registered in the central data processing equipment.

(E) *Intermediation of Data Traffic*

It is easily seen that LK can be used also for the intermediation of data traffic. Transmission of data to a certain subscriber line is done in exactly the same way as transmission of speech information. If information in digital form is obtained from a subscriber line it is put in $lum$. Intermediation of digital information to $lu$ is evidently possible if the $lu$'s in question are connected to $Abm$. Such modifications can easily be carried out within the scope of the fundamental principles of the new system.

Figure 7:
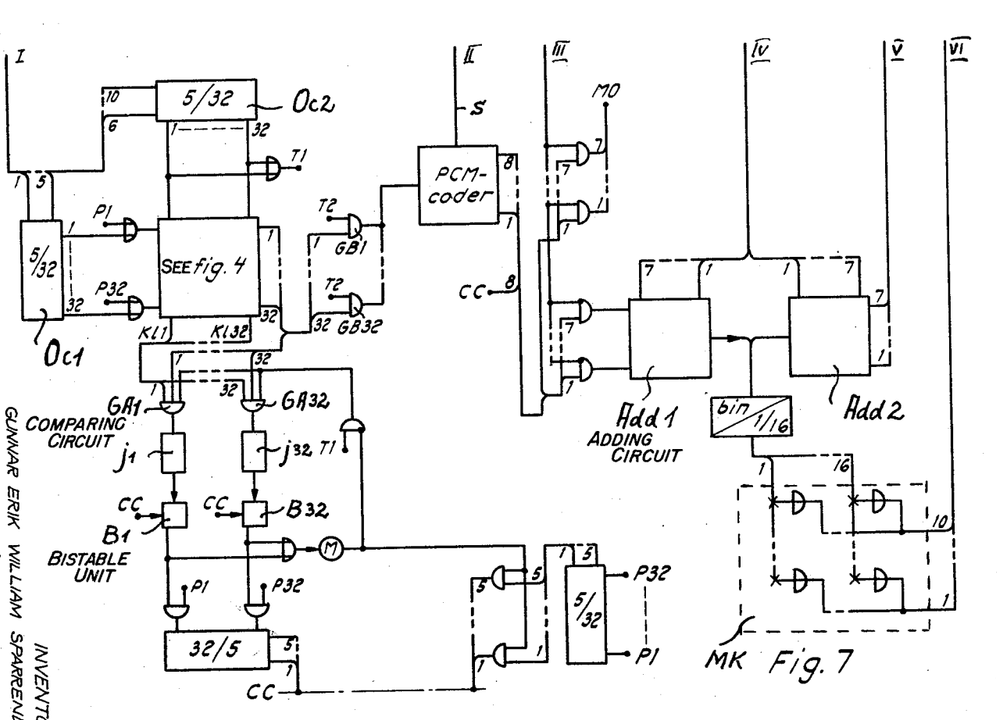
FIG. 7 shows subscriber-and-circuits for sampling and coding equipment in said exchange.
Figure 8:
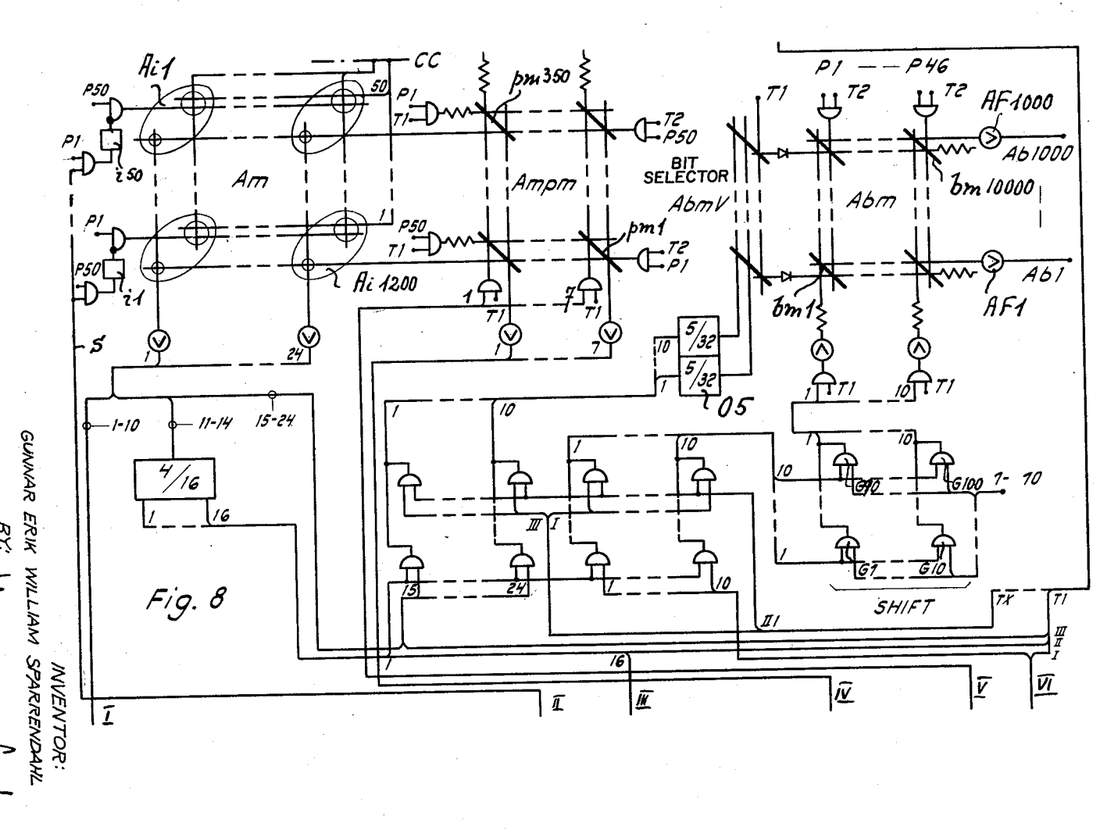
FIG. 8 shows address memory matrix, amplitude memory matrix and subscriber line memory matrix in the exchange.
Figure 9:
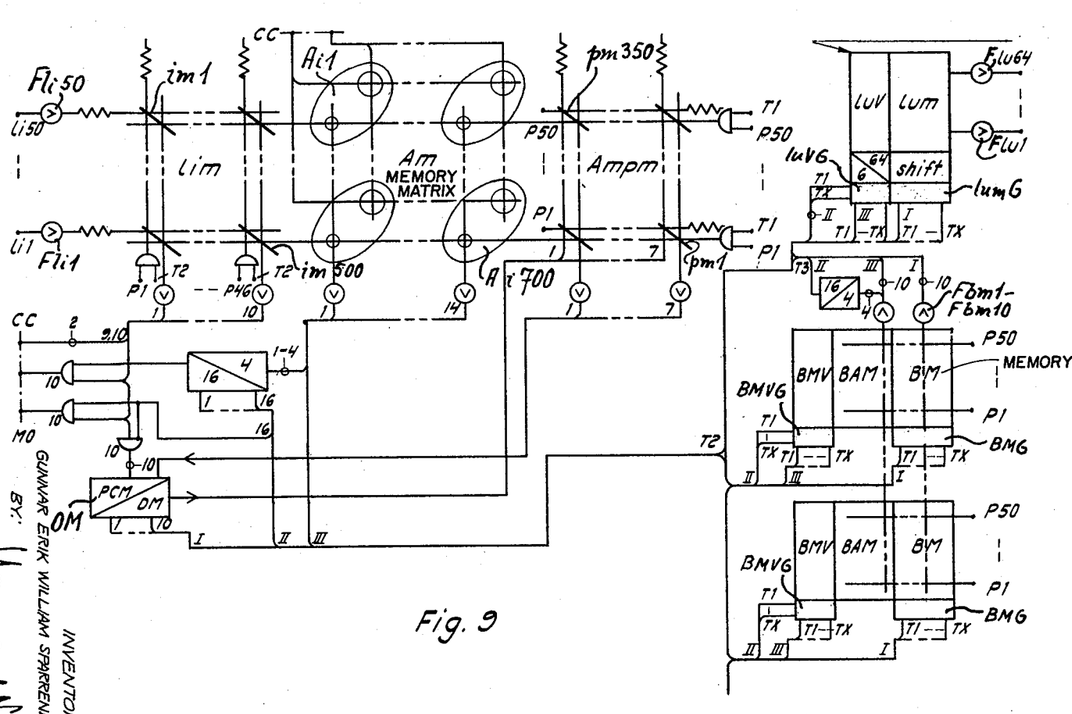
FIG. 9 shows memory matrixes for incoming and outgoing junction lines to the line concentrator and a buffer memory shown in a symbolic form.
Figure 10:
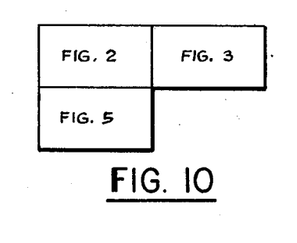
FIG. 10 is a chart showing the relationship of FIGS. 2, 3 and 5.
Figure 11:
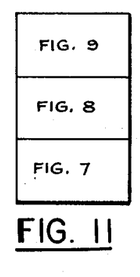
FIG. 11 is a chart showing the relationship of FIGS. 7, 8 and 9.
Figure 12:
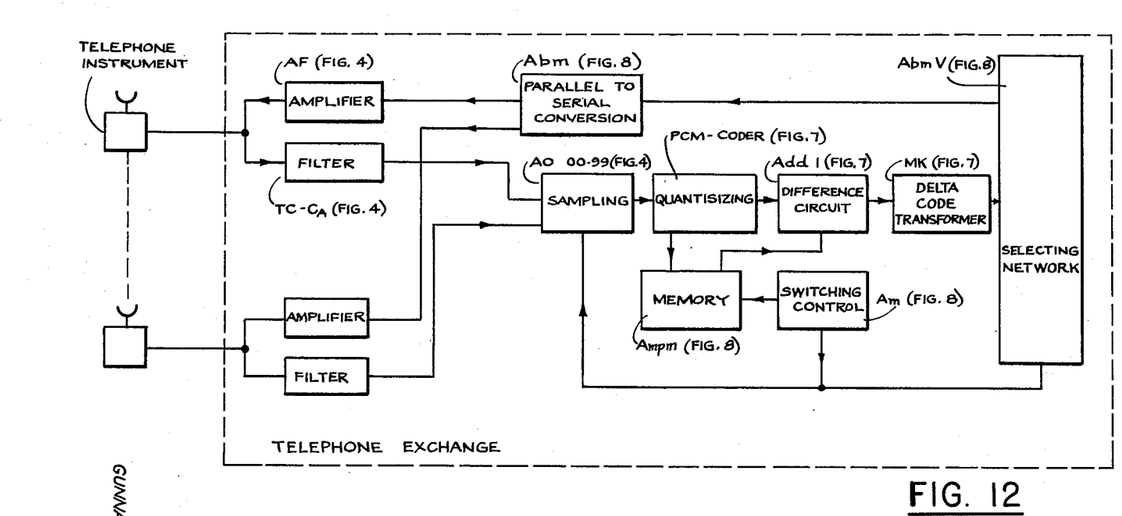
FIG. 12 is a block diagram showing the interrelationship of the portions of the system.
Figure 12A:
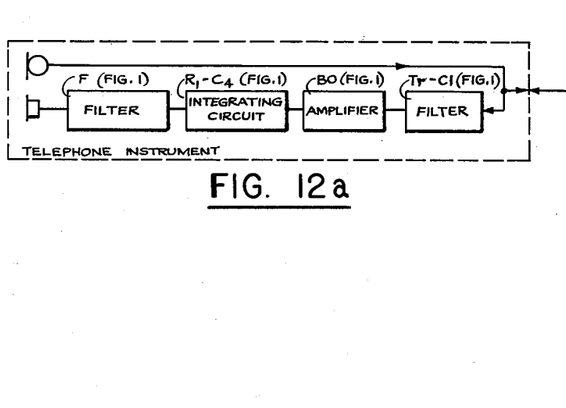
FIG. 12a is a block diagram of a telephone instrument as used in the system of the invention.

THE MAIN EXCHANGE HC (FIGS. 7–9)

HC consists of equipment for the directly connected subscriber lines, divided into groups of 1000-lines, and of the equipment for subscribers connected to line concentrators. The description in the example of embodiment according to FIGS. 7–9 refers to an exchange for circa 10,000 subscribers. The switching operations in the exchange are controlled by a common data processing equipment CC, which is not shown here. It can for example be of the same type as described in Bell System Technical Journal, September 1958, page 1091 and following published in the United States.

(A) *Equipment for a Thousand Directly Connected Subscriber Lines*

Each subscriber line has the same equipment as stated for a line concentrator according to FIGS. 2–6 in the description, i.e. a pulse amplifier AF (AF1–AF1000) and 10 ferrite cores in $Abm$ each and equipment for sampling and testing of the subscriber line, which is the same as according to FIG. 4. See FIGS. 7 and 8. In order to read the words in $Abm$ in the right sequence independent of when it is written in, each matrix $Abm$ is provided with a shifting unit SKIFT in FIG. 8.

The traffic is assumed so great that within a thousand maximally 50 subscriber lines may be active for outgoing information while maximally 50 lines may receive information simultaneously. This is assumed giving very low loss. Since each active subscriber line shall be sampled respectively receive new information each 100 μs, it means that a writing-in in $Abm$ must be able to occur once every two μs, i.e. the equipment must be controlled by a pulse generator and a pulse distribution unit, which principally are like those shown in FIG. 6, which generate 50 phase displaced 2 μs. long pulses P1–P50 (FIG. 8). Each pulse is divided into two 1μs. phases, i.e. each period of P1–P50 is divided into two half period phases T1 respectively T2, which are shown on FIGS. 7 and 8.

The addresses on the maximally 50 subscriber lines, which at the moment gives off information, are registered in a transfluxor memory A$m$ according to FIG. 8. This memory consists of 50×24 transfluxors A$i$1–A$i$1200. The address is in binary form and comprises consequently 10 bits. A$m$ stores further an address of 14 bits, which indicates whereto the information is to be sent. The first 4 bits states which thousand group is to be addressed (11–14), while the 10 last bits (15–24) state the subscriber line within the thousand group. At traffic to a thousand group, which is connected via the line concentrator LK, FIGS. 2–6, said last 10 last bits state instead which outgoing junction line is used. Hereby not all the 10 bits are required, since the subscriber line number is already registered in LK.

From FIG. 8 appears that a ferrite core memory A$mpm$ is connected to A$m$, said ferrite core memory consisting of 7×50 ferrite cores $pm$ 1 to $pm$ 350, in which memory the signal amplitude in question is registered in binary form.

From FIG. 7 appears that each thousand group also has a PCM-coder and a coding equipment for delta modulation, which forms an additional equipment to the PCM-coder.

It comprises a unit for taking the difference between two numbers in binary form (a so called parallel adder Add 1) in a known way within the electronic computer technics, these numbers being the new PCM-coded amplitude value and the former amplitude value received from A$mpm$. The difference is amplitude limited in such a way that the binary number is not allowed to exceed for example 4 bits. Greater differences give all this maximal value as a result.

If the difference exceeds this value in positive or negative direction the new amplitude value obtained from the PCM-coder shall not be registered in A$mpm$ but the amplitude value read in A$mpm$ added with sign to the amplitude limited difference obtained at the above operation. This occurs in a second parallel adder Add 2 (FIG. 7). The difference is, of course, limited to the change in amplitude, which is possible to make with 10 digits of a delta code.

(B) *Equipment in HC for Subscribers Connected via LK (see FIG. 9)*

Each incoming junction line from LK is provided with 10 ferrite cores in a core matrix $lum$, which is designed for units of 50 junction lines $li$1 to $li$50 with cores $im$1 to $im$500, and 7 ferrite cores in a core matrix A$mpm$ consequently with 350 ferrite cores $pm$1 to $pm$350, in which matrix the signal amplitude in question is registered. Furthermore each incoming junction line is supplied with 14 cores in a transfluxor memory A$m$, which in all consists of 700 transfluxors A$i$1 to A$i$700, in which memory it is registered whereto each information block in question is to be sent. Since $lim$ only registers one amplitude value at a time for each junction line, examination of $lim$ must occur with a period of 100 μs. With use of a pulse period of 2 μs as under A) the core matrixes, $lim$, A$mpm$ and A$m$ can thus be designed in units for maximally 50 incoming junction lines. Each such $lim$ matrix unit is provided with a unit OM for transformation from PCM-code to delta modulated code (FIG. 9), which is of the same design as the delta coding equipment in FIG. 7.

Each outgoing junction line to LK is like the subscriber lines provided with 10 cores, which are indicated $lum$ in FIG. 9, and a pulse amplifier FL$u$1 to FL$u$64. Writing in $lum$ (FIG. 9) can be done in an arbitrary word in each of the 50 pulse positions P1 to P50 by aid of a word selector $lu$V, which is of exactly the same design as A$bm$V in FIG. 8. To make addressing of $lum$ with 6 bits possible, $lum$ is formed in units for 64 junction lines. To be able to read the words in $lum$ in the right sequence independly of when they are written in, each $lum$ is provided with a shifting unit of the same kind as for A$bm$ shown in FIG. 8.

(C) *Equipment Common for the Different Thousand Groups and lim Core Matrix Units*

Each $lim$ unit and each 1000 subscriber lines connected directly to HC has the possibility to transmit information to each $lum$ unit and the A$bm$-matrix of each 1000 during each one of the 50 time positions P1–P50. Information can consequently be transmitted from all the thousand groups and $lim$ units during the same time position under the presumption that the information is directed to different $lum$ units or A$bm$.

However, the probability that writing-in is required in the same time position in the same $lum$ units or A$bm$ from several 1000 groups or $lim$ will be too great even if this internal loss in the system is decreased by spreading the junction lines to a cetrain LK over several $lum$ units at the described form of embodiment of HC. In order to decrease the above great internal loss a number of buffer memories BM (FIG. 9) have been inserted by aid of which an information block can be transmitted from one time position, which can be determined by over which incoming line it is received, to an arbitrary other time position. The buffer memories BM consist of words of 10 bits and a belonging transfluxor memory BAM for $lum$ and A$bm$ addresses of 14 bits. Each buffer memory BM is provided with a word selecter BMV of the same design as the word selector A$bm$V in FIG. 3 or 8. Besides, each buffer memory is provided with a gate circuit BMG consisting of some and-circuits in correspondence with the same part in FIG. 8. The word selector BMV is provided with the corresponding gate circuit BMVG. Writing in in the BM units can be done simultaneously from several $lim$, whereby the number of BM units is determined by the traffic. Reading from the buffer memories can be done in the same way as from $lim$ by the pulses P1 to P50. The reading amplifiers F$mb$1–F$mb$10 can be common for the different BM units. Writing-in of the addresses to the transfluxor memories A$m$, which determine whereto the different information blocks are to be sent, is done by the common data processing equipment CC not shown on the diagram. Of course, also the equipment for tandem exchange traffic belongs to HC, but it is not described here.

(D) *The Course of Events at Information From a Thousand Group for Directly Connected Subscriber Lines (Ab1–Ab1000 in FIG. 8)*

The subscriber line equipment is principally of the same embodiment as appears from FIG. 4. The 1024 subscriber-and-circuits are, however, as appears from FIG. 7, connected in crossing points between 2×32 co-ordinate conductors going out from recording arrangements Oc1 and Oc2 in the same way as in the line concentrator LK (FIG. 4). Testing after "call" occurs during phase T1 and testing of the subscriber lines registered in the transfluxor memory A$m$ during T2.

The secondary side of the transformer TC and the conductors KL in FIG. 4 are in FIG. 7 taken together over the 32 subscriber circuits in the same co-ordinate and go to gate circuits GA1–GA32 and GB1–GB32. The latter are connected to 32 comparison circuits $j$1–$j$32, which are connected to 32 bistable units B1 to B32 (FIG. 7). Call examination occurs thus for 32 subscriber circuits at a time, at which the pulses P1 to P32 are used. All the lines are thus tested each 100 μs. If one or several "calls" are discovered during a testing pulse it is registered on corresponding bistable units B1 to B32. These units inhibit further registering of calls until transmission of the number of the calling lines to CC has occurred, and causes transmission to CC of the 5 first bits in the number of the calling lines by aid of the pulse position in question. The units B1 to B32 are then tested by P1 to P32, at which the binary numbers of the trigged units are registered in CC as appears in FIG. 7. After one cycle of the pulse distribution B1–B32 is restored by CC.

CC examines first whether it is a new call or a new information block on an already existing communication. This is done by comparing the connection data registered in memories in principally the same way as described in Bell System Technical Journal, September 1958/1091 and following published in the United States.

If an already existing communication is involved, the data processing equipment CC in the transfluxor memory matrix A*m* (FIG. 8) for the thousand group the "calling" line belong to, shall register the addresses of the two subscriber lines taking part in the communication, these addresses will here be indicated *li*-address respectively *lu*-address. At this the operations will be different depending on if the opposite subscriber line is connected to any 1000 group with direct subscriber lines or to some LK.

If opposite subscriber line is directly connected to HC, CC examines if there is any time position free for reading in A*m* at the same time as a time position for writing in in A*bm* is free in the thousand groups or thousand group in question. If such a time position is found the *lu*-address of 14 bits is written in in corresponding word in A*m*. If no such a time position is found the address according to the diagram in FIG. 9 to a buffer memory unit BM and to one of the 50 words within the BM unit is written in in A*m*. Each word within BM corresponds to one of the 50 pulse positions for reading. CC selects a pulse position that is free for writing in in the A*bm* unit in question. In the address part of BM the *lu* number in question is written in, i.e. the address to A*bm* and word within A*bm*.

If the opposite subscriber line is connected over LK, CC selects first a free junction line to LK before the same proceeding as above is initiated for selection of free time position for writing in in *lum* directly or via BM. Then CC writes in the subscriber line number of 10 bits in *lum*.

Both in A*bm* and *lum* it can be necessary to start the information blocks with a pulse series, which sets the right zero level in the demodulator of the telephone instrument. The speech information obtained from the "calling" subscriber when this happens can be erased. In the same way the word obtained from the "calling" subscriber, when the sending of the subscriber line number occurs from *lu*, is, of course, erased.

Each 100 $\mu$s. the *li* and *lu* addresses are read from A*m* and the preceding amplitude from A*mpm*. The preceding amplitude value goes to the delta coder in FIG. 7 at the same time as the *li* number is transformed from binary code of 10 bits to pulses on 2 of the 2×32 co-ordinate conductors in the sampling and testing device (see FIG. 7 and FIG. 4). The result of the sampling is obtained during T2 over the gate in question of the gates GB1 to GB32 to the equipment for delta coding or PCM coding. PCM coding is done at tandem exchange traffic.

The difference between the new amplitude value from the PCM coder and the preceding amplitude value obtained from A*mpm* is obtained in binary form, is amplitude limited to for example 4 binary digits and is transformed to delta code, i.e. for each value of the binary code, for example 1 to 16, a combination of pulses among the 10 delta digits is selected. This occurs in the translating unit MK.

How the coding is done in detail depends on the values that are selected on time constant and pulse amplitude in the delta demodulator of the telephone instrument. Which delta code to be selected depends also on if the PCM-coder is provided with amplitude compression. It can consist of a shunting diode before the PCM-coder.

If a higher quality of the speech is wanted than the one that can be obtained with the system shown in the figures, the memory A*mpm* (FIG. 8) can be formed for registering of 2 amplitude values of 7 bits each. The difference between the two amplitudes registered in A*mpm* is not transformed until the next, i.e. a third amplitude value, is sampled. The first amplitude value corresponds consequently to the amplitude attained by the address instrument by aid of the delta modulated signals sent up to now. The second amplitude value was obtained at the previous sampling. At each sampling the two amplitude values registered in A*mpm* are changed.

The delta coding equipment can also be provided with automatic volume control (not shown in the figures). CC examines if the received amplitude for a certain communication has shown high amplitudes during a certain time. This can be done by counting the number of times per time unit the first bit in the PCM-coded amplitude is one. If this number exceeds a certain value all the amplitude values coded in PCM-form are reduced with a certain number. The most simple way to do this is by increasing the amplitude value with signs with a certain constant before writing in in A*mpm*. The constant can be different depending on the frequency of high amplitudes measured by CC.

The obtained delta word of 10 bits is transmitted to the A*bm*, *lum* or BM unit chosen by the *lu* address. At the writing in in A*bm* transform-action of the 10 last bits in the *lu*-address occurs first in the recoding unit O5 (FIG. 8) to pulses on 2 of the 2×32 conductors, which select a core in A*bm*V during phase T2. During phase T1 this core is restored, at which writing-in half current is obtained in the word in question in A*bm*. At the same time the delta coded word is written in, at which, however, said delta coded word is first displaced sideways in the shifting unit SKIFT belonging to A*bm*. The shifting unit is controlled by 10 pulses 1 to 10, at which 1 coincides with P1 to P5, 2 with P6 to P10 and so on. The shifting unit consists of 100 gate circuits G1–G100, ten for each pulse 1 to 10, at which writing in in A*bm* occurs in such a sequence that piece No. 1 is always read first from A*bm*, then piece No. 2 and so on. Reading of A*bm* occurs once every 10 $\mu$s. during phase T2.

If an amplitude separated from zero is obtained at the coding a pulse is obtained on the conductor S, FIGS. 7 and 8, at which the integration circuit *i*1–*i*50 belonging to the time positions is charged. If an amplitude separated from zero has not been obtained during a time of about 1 ms., the addresses in A*m* are erased. The time constant can, of course, also be chosen longer if so is suitable. This time supervision function can alternatively be done by the data processing equipment CC.

Writing-in in *lum* occurs in principally the same way as writing in in A*bm*, but owing to the small size of *lum* the word address for *lum* is only 6 bits. Writing in in BM occurs in the same way as writing in in *lum*, at which, however, any shifting unit is not needed.

If a call is obtained from a subscriber line and CC knows that the line was free, the subscriber line is connected to a key set signal receiver, which is not shown on FIGS. 7–9. The key set receivers are connected to *lum* in the same way as the junction lines to LK.

At establishing the ringing on called subscriber and the sending of tone to the calling subscriber occur (for example in analogy with the way described in Bell System Technical Journal, September 1958, page 1091). The ringing signal generators and the tone generators are in the present system connected to *lim*. The connections with these signal generators are, of course, established only during the signalling but are broken during the pause between the signals.

(E) *Course of Events at Information From Junction Lines From LK*

The pulses from the incoming lines are amplified in the monostable amplifiers F*li*1–F*li*50 (FIG. 9) to a pulse breadth of four example 4 $\mu$s.) and are written in in *lim* through coincidence with a P-pulse during phase T2. Reading occurs during phase T1 by P1 to P50, at which the different lines are divided into groups with different pulse phases so that reading occurs in the pause between the incoming pulses. This is possible by the pulse generator on LK being synchronized by the pulses coming from HC. In FIG. 9 it is presumed that reading occurs when a whole word is registered in *lim*, which presupposes that the junction lines are divided into 10 groups, which are about one pulse position displaced among themselves. If soldering of each line in accordance with its pulse phase is not wanted, there is another possibility that CC in permanent memories keep the pulse phase of the lines and that each *lim* is provided with a shifting unit controlled by CC. This is not shown in the example of embodiment.

Each *lim* unit is provided with a unit for transformation of the first 4 bits in the *lu* address to one of 16 and a unit for transformation of the PCM-code obtained from LK to delta code. This equipment consists of the same equipment as at the directly connected 1000 group in FIG. 7 except for the PCM-coder, i.e. quantisizing unit, not being necessary.

At "call" there is no address in A*m*, and therefore the *lim* unit transmits the "calling" number of the subscriber line to CC. Writing in and erasing of addresses is the same problem as at the directly connected 1000-group and so is the transmission of information to A*bm*, *lum*, BM or to equipment for tandem exchange traffic.

In order to avoid compression of the signal at PCM-coding, it can alternatively be coded in a PCM-amplitude of 9 bits. Here the 10th bit from LK is used for hook signalling. At tandem exchange traffic the difference between the new amplitude value of the 9 bits and the preceding amplitude value of 9 bits is transformed to a PCM-code of 7 bits. This code is sent to another exchange and the new amplitude value of 9 bits is written in in A*mpm*.

I claim:

1. In a telecommunication system comprising a telephone exchange and a plurality of telephone instruments each of which is connected over a two-wire line to said exchange, said telephone exchange including means for quantisizing analog signals coming from any one of the telephone instruments over the two-wire line connected to said instrument, means for transmitting the quantisized signals through the exchange in digital form, said means for quantisizing the analog signals including circuit means for sampling analog signals on subscriber lines connecting the telephone instruments to the telephone exchange, a circuit for quantisizing the amplitude values of the sampled analog signals in a pulse modulated code, a memory circuit for storing amplitude values of the sampled analog signals in digital form, a circuit for calculating the difference between the amplitude values of sampled analog signals in pulse modulated code and amplitude values stored in the memory circuit in digital form and referred to signals transmitted up to now to a telephone instrument, and a circuit for transforming said difference into delta code, each of said telephone instruments including means for demodulating delta modulated signals consisting of signals in delta code coming from the telephone exchange over the two-wire line connected to the instrument.

2. In a telecommunication system according to claim 1, including a plurality of telephone exchanges used as main exchanges, a plurality of line concentrators dependent on these main exchanges and a plurality of telephone instruments connected over two-wire subscriber lines to the main exchanges and a number of telephone instruments connected over two-wire subscriber lines to the line concentrators, said main exchanges and line concentrators each including means for sampling and quantisizing signals coming from the telephone instruments, and means for transmitting delta modulated signals to telephone instruments, said means of said main exchanges comprising a quantisizing circuit for quantisizing the amplitude values of the sampled analog signals in a pulse modulated code, a memory circuit for storing amplitude values in digital form, a circuit for calculating the difference between the amplitude values of the sampled analog signals in pulse modulated code and corresponding amplitude values stored in the memory circuit in digital form and referred to delta modulated signals transmitted up to now to telephone instruments, a circuit for transforming said difference to delta code and transmitting delta modulated signals to telephone instruments, and said means of said line concentrators including a quantisizing circuit for quantisizing the amplitude values of the sampled analog signals in a pulse modulated code and transmitting the modulated signals to the memory circuit and the calculating circuit of one of the main exchanges.

3. In a telecommunication system according to claim 1, including a plurality of telephone exchanges each provided with an electronic exchange, to which incoming lines and outgoing lines for transmission of speech information between telephone instruments are connected, the telephone exchanges include means for data processing of information and means for sampling and quantisizing of speech information coming in analog form from the telephone instruments over the two-wire lines and the incoming lines and for transmission of this information and incoming signals in digital form through the exchange, the last-mentioned means being arranged to have both kinds of said digital signals transmitted through the exchange as simultaneous signals on a plurality of signal conductors, said digits being registered in a number of bistable elements which are read successively by a pulse distribution unit common for the elements so that the digits read are sent in series form on the outgoing lines.

4. In a telecommunication system according to claim 3, wherein the electronic exchanges have a limited number of simultaneous transmission possibilities and the means for quantisizing of speech information is arranged to allot a certain telephone communication over two-wire lines a transmission possibility through the exchange when speech signals are carried in respective subscriber line, the said means for data processing of information being arranged to periodically test passive subscriber lines for controlling the amplitude of the analog signals.

5. In a telecommunication system according to claim 3, wherein the telephone exchange includes memories for the transmission of the speech signals between the telephone exchanges for registering the amplitude values of signals, the memories are arranged to transmit in digital form the algebraic difference between the sampled amplitude values following one after the other in pulse code modulated form so that each value of the difference transmitted consists of a smaller number of bits than the number of bits each amplitude value first is coded in.

6. In a telecommunication system according to claim 3, wherein communication channels connected to telephone exchanges with substantially heavy traffic are divided into groups, each group being provided with a common means for writing in or reading the individual bistable elements of each communication channel, and at which for writing in for groups of outgoing communication channels there is only a limited number of time positions, and said main exchanges are provided with a buffer memory for transmitting blocked information blocks to another time position in the case a need arises to transmit more than one information block to the same group of outgoing communication channels in the same time position moment.

References Cited in the file of this patent

UNITED STATES PATENTS

| | | |
|---|---|---|
| 2,816,267 | DeJager | Dec. 10, 1957 |
| 2,837,719 | Albanese | June 3, 1958 |
| 2,927,962 | Cutler | Mar. 8, 1960 |
| 2,986,602 | Tubinis | May 30, 1961 |